Oct. 19, 1948.   H. L. WOOD   2,451,704
LIQUID LEVEL GAUGE
Filed Dec. 7, 1946
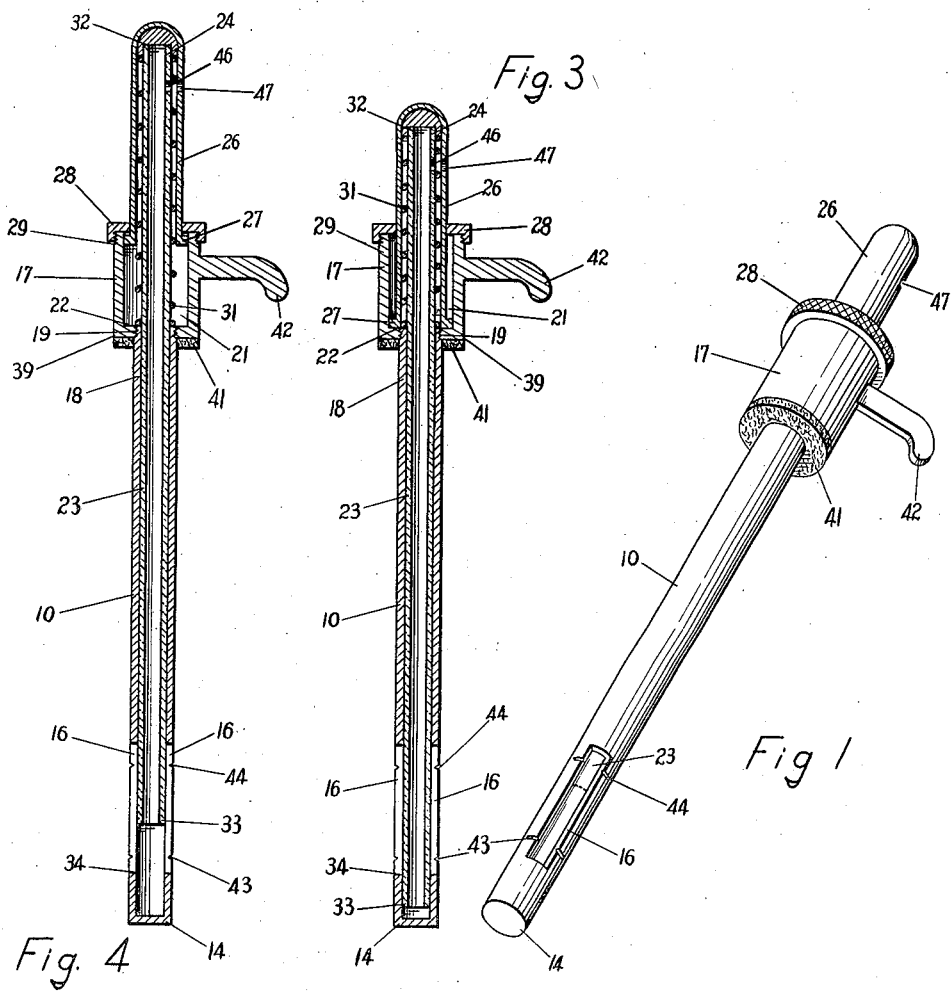
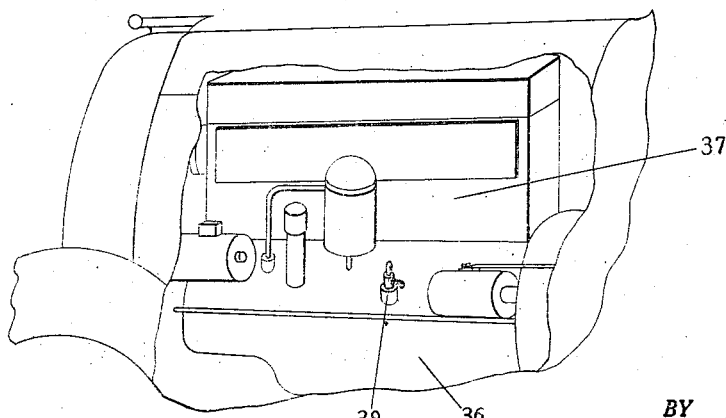
INVENTOR.
Howard L. Wood
BY
Rudolph L. Lowell
ATTY.

Patented Oct. 19, 1948

2,451,704

UNITED STATES PATENT OFFICE 2,451,704

LIQUID LEVEL GAUGE

Howard L. Wood, Oskaloosa, Iowa

Application December 7, 1946, Serial No. 714,790

3 Claims. (Cl. 73—425.4)

This invention relates generally to liquid level gauges and in particular to a gauge for indicating the level of oil in the crankcase of an automobile engine.

Most oil gauges now commonly used with automobile engines consist merely in a metal rod, insertible within a crankcase opening, and having "low" and "full" graduations marked on its lower end. In determining the oil level in the crankcase the rod is first removed and wiped clean and then reinserted within the crankcase and removed a second time to observe the extent to which the oil has adhered to the rod relative to the graduations.

This method is generally unsatisfactory due to the fact that when the oil is clean and/or of a light weight, it is not readily visible on the oil rod. Also, unless the rod after being wiped clean is insertible as far as possible into the crankcase the oil level reading is erroneous. Further, on inserting the rod for reading purposes, care must be exercised to keep the lower end of the rod from rubbing against any oil-covered surface on the side wall of the crankcase opening.

It is an object of this invention, therefore, to provide an improved liquid level gauge.

A further object of this invention is to provide an oil level gauge which is efficient in operation to positively indicate the oil level in the crankcase of an automobile engine.

Another object of this invention is to provide an oil level gauge which clearly indicates visually the level of oil in an engine crankcase regardless of the weight or cleanliness of the oil.

Still another object of this invention is to provide a gauge for visually indicating the level of oil in the crankcase of an automobile engine, which is of a compact and simple construction, operable to an indicating position concurrently with its initial removal from the crankcase, and readily adapted for application to a wide variety of automobile models.

A feature of this invention is found in the provision of a gauge for indicating the level of fluid in a container, in which an inner tube is in telescoping relation within an outer tube of a shorter length than the inner tube. The lower end of the outer tube is closed and formed with a longitudinally extended slot which is closed to trap liquid in the inner tube, on movement of the inner tube to a telescoped position, and opened to permit the flow of liquid into the inner tube, on movement of the inner tube to an extended position. A yieldable means on the open end of the outer tube is adapted to move and hold the inner tube in its extended position. The inner tube, opposite the slot in the outer tube, is formed of a transparent material so that the slot constitutes a window for visually observing the level of oil trapped in the inner tube.

Further objects, features and advantages of this invention will become apparent from the following description, when taken in connection with the accompanying drawings, in which:

Fig. 1 is a perspective view of the liquid level gauge of this invention;

Fig. 2 is a perspective view of the front portion of an automobile, with parts broken away, illustrating the application of the gauge of this invention to an automobile engine;

Fig. 3 is a longitudinal sectional view of the gauge; and

Fig. 4 is illustrated similarly to Fig. 3 with parts being shown in changed positions.

With reference to the drawings, the oil level gauge of this invention is illustrated in Figs. 1, 3 and 4 as including an outer large tube 10, of a metal material, closed at one end 14, which for convenience shall be hereinafter referred to as its lower end. Spaced from such lower end 14 is a pair of oppositely arranged longitudinally extended slots 16 which constitute fluid openings.

A body member 17 (Figs. 3 and 4) of a cylindrical shape, and mounted on the top end 18 of the large tube 10, is formed with a central bore having an internally threaded reduced section 19 and an enlarged section 21. The top end 18 of the tube 10 is threadable within the reduced section 19, with the junction of the bore sections 19 and 21 being defined by an annular shoulder 22.

Slidably supported in a telescoping relation within the large tube 10 is a small inner tube or valve member 23 composed of a transparent plastic material and of a length longer than the large tube 10. When the small tube is in its fully contracted position within the large tube, as illustrated in Fig. 3, its outer end 24 projects from the top end 18 of the large tube and outwardly from the body member 17 through the enlarged bore section 21.

Mounted in a concentrically spaced relation about the outer end 24 of the small tube 23 is a hollow cylindrical cap member 26 integrally formed at its inner end with an annular projection or stop member 27 of a size and shape providing for its slidable movement within the enlarged bore section 21. A ring-shaped nut 28 mounted about the cap member 26 and threadable on the outer end 29 of the body member 17 is engagable with the projection 27 to limit the movement of the small tube 23 outwardly from the large tube 10. The movement inwardly of the small tube 23 relative to the large tube 10 is defined by the engagement of the stop member 27 with the annular shoulder 22.

The small tube 23 is moved and held in its outermost position (Fig. 4), defined by the engagement of the projection 27 with the nut 28, by the provision of a coil spring 31 mounted about the outer end 24 of the small tube and arranged in compression between the top end 18 of the large tube 10 and the closed end 32 of the small tube 23.

When the small tube 23 is in its outermost position, the inner end 33 thereof is within the longitudinal confines of the slots 16, whereby the slots are open to the space inside of the small tube. On movement of the small tube 23 to its contracted position within the large tube (Fig. 3) the inner end 33 thereof is below the lower edges or sides 34 of the slots 16 whereby the slots are closed relative to the space within the small tube 23.

In the operation of the oil gauge of this invention assume that it is to be used in indicating the oil level in the crankcase 36 of an automobile engine 37 (Fig. 2). The gauge, with its parts arranged as illustrated in Fig. 4, is inserted within a usual oil gauge or crankcase opening, indicated at 38, to a position at which the inner end 39 is supported on the peripheral side wall of the gauge opening 38.

A felt gasket 41 may be mounted on the large tube 10 at a position against the inner end 39 of the body member 17 to prevent dust, grit and the like from entering the crankcase about the gauge during a normal operation of the automobile. With the gauge thus inserted in the crankcase, oil in the crankcase flows through the slots 16 and into the space within the small tube 23 to a height corresponding to the level of the oil in the crankcase.

To visually observe the level of the oil in the crankcase a laterally extended finger grip 42 integrally formed on the body member 17 is hooked with one finger of the hand, and the closed end of the cap member 26 is pressed by the thumb of the same hand to move the inner tube 23 against the action of the spring 31 to its contracted position illustrated in Fig. 3, at which the projection 27 is against the annular shoulder 22. By virtue of this inward movement of the inner tube 23 its lower end 33 is moved below the bottom edges 34 of the slots 16 whereby to trap the oil within the inner tube 23.

With the small tube 23 maintained at its inward or contracted position, the gauge is removed from the crankcase opening 38 and the level of the oil in the transparent tube 23 is visually observed through the slots 16 which constitute observation windows in the large tube 10. Suitable graduations, such as indicated at 43 and 44, may be marked on the large tube 10 to indicate "low" and "full" oil readings, respectively.

To assure the free entrance of the oil from the crankcase into the inner tube 23, vent openings 46 and 47 are formed in the outer end 24 of the tube 23 and in the cap member 26, respectively, which openings are continuously open to the atmosphere.

On completion of an oil-level reading, the gauge is reinserted within the crankcase 38 and the cap member 26 released. The oil in the crankcase is thus again permitted to enter the space within the inner tube 23 whereby to provide for a later oil reading in the same manner as described above.

From a consideration of the above description, it is seen that the invention provides an oil level gauge which is of a simple and compact construction, and positive in operation to accurately indicate the oil level in an engine crankcase. The inner end 33 of the small tube 23 functions as a valve relative to the slots 16 to control the flow of oil into and out of the space within the small tube, which is acted upon by the spring 31 so as to always be in a slot-opening position, except when the cap member 26 is manually depressed. As a result an oil level reading can be taken on an initial removal of the gauge from the crankcase.

Although the invention has been described with respect to a preferred embodiment thereof, it is to be understood that it is not to be so limited since changes and modifications can be made therein which are within the full intended scope of this invention as defined by the appended claims.

I claim:

1. A gauge for indicating the level of liquid in a container between predetermined high and low liquid levels comprising, a large tube member closed at its bottom end and having a slot spaced from such bottom end, a small tube member slidable within said large tube having a transparent portion movable across said slot and an outer portion projected from the top end of said large tube, a body member mounted on the top end of said large tube having a bore therethrough, with the outer portion of said small tube being extended through the bore in said body member, stop means for limiting the slidable movement of said small tube member relative to said large tube member, means carried on said body member for yieldably moving and holding said small tube at a position extended outwardly from said large tube, with said small tube being movable within said large tube, against the action of said yieldable means, to close said slot, and means for supporting the gauge within said container such that said slot extends between said predetermined high and low liquid levels.

2. A gauge for indicating the level of liquid in a container between predetermined high and low liquid levels including a pair of telescoping tubes with the larger one of said tubes being closed at its lower end and the smaller tube being extended from the top end of said larger tube when in a telescoped position, said larger tube having a longitudinally extended slot spaced from the closed end thereof, and the inner portion of said smaller tube being formed of a transparent material, a body member mounted on the top end of said larger tube having an opening therethrough to receive said smaller tube, stop means for limiting the telescoping movement of said smaller tube relative to said larger tube, yieldable means on said body member adapted to move and hold said smaller tube in an extended position outwardly from said larger tube such that the inner end of said smaller tube is above the lower side of said slot, with said inner end, on movement of said smaller tube to its contracted position, being movable to a position below said lower side of the slot, and means supporting the gauge within said container such that the extremities of said slot are substantially within said predetermined high and low liquid levels.

3. A gauge for indicating the level of a liquid in a container between predetermined high and low liquid levels comprising, a tube member closed at its bottom end, and having a longitudinal slot spaced from said bottom end, a tubular valve member slidably movable within said tube member to a first position at which the inner end thereof is below said slot to close the same, and to a second position at which said slot is open to provide for a flow of liquid within said valve member, stop means for limiting the movement of said valve member between said two positions therefor, with the inner end portion of said valve member having a transparent section therein opposite said slot whereby the level of the liquid in said valve member is visually observed through said slot, means for yieldably moving and holding said valve member in said second position, with said valve member being movable against the action of said yieldable means to said first position, and means for supporting the gauge within said container such that said slot is positioned between said predetermined high and low liquid levels.

HOWARD L. WOOD.

REFERENCES CITED

The following references are of record in the file of this patent:

UNITED STATES PATENTS

| Number | Name | Date |
|---|---|---|
| 2,067,795 | Skuret | Jan. 12, 1937 |
| 2,333,711 | Swiggins | Nov. 9, 1943 |

FOREIGN PATENTS

| Number | Country | Date |
|---|---|---|
| 1,298 | Great Britain | 1902 |